United States

Kusters

[15] 3,687,521
[45] Aug. 29, 1972

[54] ELECTRONICALLY TUNABLE ACOUSTO-OPTIC FILTER HAVING IMPROVED LIGHT AND ACOUSTIC WAVE INTERACTION

[72] Inventor: John A. Kusters, San Jose, Calif.

[73] Assignee: Hewlett-Packard Company, Palo Alto, Calif.

[22] Filed: Dec. 28, 1970

[21] Appl. No.: 101,622

[52] U.S. Cl. ................. 350/149, 350/157, 350/161
[51] Int. Cl. ................................................. G02f 1/24
[58] Field of Search ............ 350/147, 149, 150, 157, 160–161, 350/96 WG

[56] References Cited

OTHER PUBLICATIONS

Dixon, "Acoustic Diffraction of Light in Anistropic Media" IEEE J. Quant. Electron. Vol. QE–3, No. 2 (Feb. 1967) pp. 85–93

Harris et al., "CaMoO$_4$ Electronically Tunable Optical Filter" App. Phys. Lett. Vol. 17, No. 5 (Sept 1, 1970) pp. 223–225

Harris et al., " Electronically Tunable Acousto– Optic Filter" App. Phys. Lett. Vol. 15, No. 10 (Nov. 15, 1969) pp. 325–326

Harris et al., " Acousto– Optic Tunable Filter" J.O.S.A. Vol. 59, No. 6 (June 1969) pp. 744–746

*Primary Examiner*—David Schonberg
*Assistant Examiner*—Paul R. Miller
*Attorney*—Roland I. Griffin

[57] ABSTRACT

An electronically tunable acousto-optic filter is provided wherein an optical wave is diffracted by an acoustic wave in a birefringent crystalline medium from a first polarization into an orthogonal second polarization. Both the optical wave and the acoustic wave are transmitted through the birefringent crystalline medium along a path for which the phase and group velocity vectors of the acoustic wave are non-collinear. The input to the filter is formed so that the group velocity vector of the acoustic wave is aligned with the velocity vector of the optical wave in the birefringent crystalline medium, which may be positioned in a fluid bath to optimize the optical transmission path through the medium. Both the acoustic wave and the optical wave may be transmitted through another medium before entering the birefringent crystalline medium to properly align the group velocity vector of the acoustic wave and the velocity vector of the optical wave.

24 Claims, 6 Drawing Figures

INVENTOR
JOHN A. KUSTERS

BY Roland I. Griffin

ATTORNEY

ELECTRONICALLY TUNABLE ACOUSTO-OPTIC FILTER HAVING IMPROVED LIGHT AND ACOUSTIC WAVE INTERACTION

BACKGROUND OF THE INVENTION

Electronically tunable acousto-optic filters have been constructed wherein an optical light wave of a first polarization traveling collinearly with an acoustical wave through an optically anisotropic medium, such as a birefringent crystal, is diffracted by the acoustical wave from the first polarization into a second polarization. The light of the second polarization may be separated from that of the first polarization at the output. The frequencies of the acoustic wave and the optical wave are related such that the bandpass characteristics of the acousto-optic filter may be changed or tuned over a range of optical frequencies by varying the frequency of the acoustic wave. Such an acousto-optic filter is disclosed in an article entitled "Acousto-Optic Tunable Filter" appearing in the Journal of the Optical Society of America, Vol. 59, No. 6 of June 1969, pages 744–747, and in an article entitled "Electronically Tunable Acousto-Optic Filter" appearing in the Applied Physics Letters, Vol. 15, No. 10, of Nov. 15, 1969, pages 325 and 326.

To optimize the interaction between the acoustic and optical waves, the two waves should maintain collinearity over appreciable distances. It has been found that, for certain anisotropic media, with the two waves superimposed so that the phase velocity vector of the acoustic wave is aligned or collinear with the optical wave, the group velocity vector of the acoustic wave lies along an axis at an angle to the direction of the phase velocity vector of the acoustic wave. The acoustic wave then tends to deviate, or "walk away," from the optical wave, and the desired interaction lessens.

BRIEF SUMMARY OF THE INVENTION

In the present invention a method and means is provided whereby the acoustic wave is introduced into the anisotropic medium such that the direction of the group velocity vector of the acoustic wave is aligned with the direction of propagation of the optical wave, the direction of the phase velocity vector of the acoustic wave being at some angle relative to the direction of the group velocity vector of the acoustic wave. The interaction between the acoustic and optical waves is thereby optimized.

In one embodiment of this invention, the optical wave is introduced into the medium anisotropic through one surface thereof while the acoustic wave is introduced through a different surface and reflected from said one surface and into the desired collinearity with the optical wave. The face angle of said one surface of the anisotropic medium is selected so that the acoustic wave is reflected from that surface with its group velocity vector collinearly oriented in the direction of propagation of the optical wave through the anisotropic medium and with its phase velocity vector oriented at a "walk-off" angle relative to its group velocity vector. Illustrative examples of anisotropic material are quartz for ultra-violet light and lithium niobate for infra-red.

In a further embodiment of this invention, the optical wave, before passing into the anisotropic medium, is transmitted through a selected medium with an index of refraction chosen to provide an optimum input aperture for the optical wave and proper alignment with the acoustic wave in the anisotropic medium. For example, an anisotropic medium of quartz may be located in a bath of water while an anisotropic medium of lithium tantalate may be placed in a silicon oil bath to optimize the optical beam transmission.

In still another embodiment, both the optical wave and acoustic wave are introduced into the anisotropic medium through another adjoining medium, to aid in control of the beam directivity.

DESCRIPTION OF THE PREFERRED EMBODIMENTS

Figure 1:
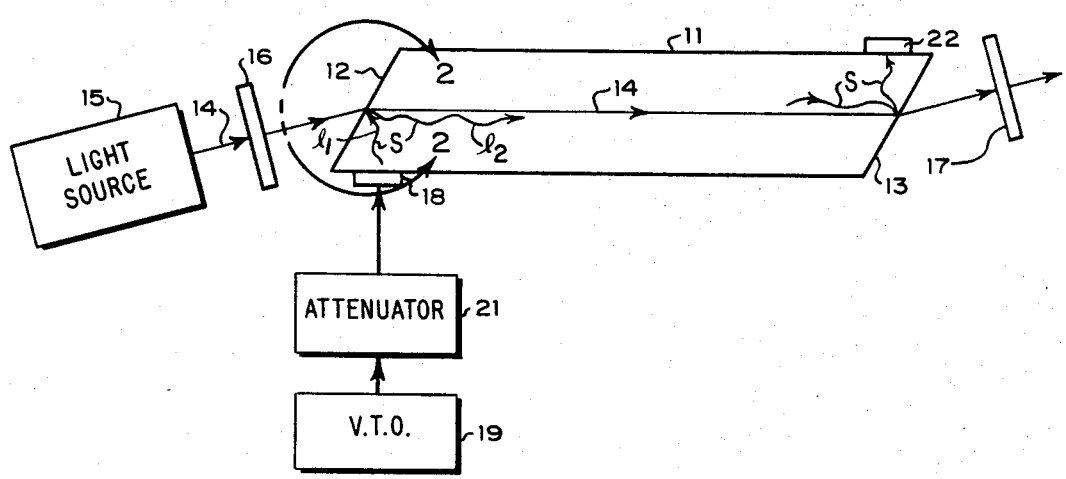
FIG. 1 is a schematic diagram of an acousto-optic filter incorporating the improvement of the present invention.

Referring now to FIG. 1, a known form of acousto-optic filter comprises a suitable anisotropic medium 11, for example, a birefringent quartz crystal one centimeter square in transverse cross section and ten centimeters in length, provided with angled input and output end surfaces 12 and 13, respectively. The longitudinal axis of the main body 11 is hereafter referred to as the Y-axis, while the X-axis is perpendicular to the plane of the drawing and the Z-axis extends in the vertical direction of the drawing.

The optical beam 14 from source 15, for example, ultra-violet light in the case of a quartz body 11, is transmitted into the body 11 through the input surface 12 (preferably cut at Brewster's angle to minimize transmission reflection losses), passes along the Y-axis of the body, and exits through the output end 13. This light is polarized in a first direction along the Z-axis by the linear polarizer 16. To observe or otherwise utilize that portion of the light that is diffracted from the light beam by the acoustic wave, an output linear polarizer 17 with an axis of polarization along the X-axis is positioned in the path of the output beam and passes that light which is polarized orthogonally to the polarization of the input beam 14.

An acoustical transducer 18 is mounted in intimate contact with the crystal 11 and is connected to a suitable signal generator or source 19 such as a voltage tunable oscillator, the frequency of which can be varied by varying the input voltage thereto. In this embodiment, an X-cut lithium niobate transducer 18 is utilized. The RF output of the voltage tunable oscillator 19 is fed via an adjustable attenuator 21 to the acoustic transducer 18 for generating an acoustic shear wave, S, which is internally reflected from the input face 12 of the crystal 11. After reflection, the acoustic shear wave and the input light beam 14 propagate collinearly along the Y-axis of the crystal 11. For a particular combination of light wave and acoustic wave frequencies, there is found to be a strong interaction between the light wave and the acoustic wave in which the acoustic wave diffracts the light wave from the polarization orientation of the input beam into the orthogonal polarization. This yields a narrow pass band of light waves of orthogonal polarization which are then separated from the input light waves by horizontal linear polarizer 17. This narrow pass band of light waves is a function of the applied acoustical frequency and can therefore be varied in frequency by varying the frequency of excitation supplied by the voltage tunable oscillator 19. The acoustic shear wave S is reflected off the end face 13 and absorbed by acoustic absorber 22.

This collinear diffraction occurs as a cumulative effect for a very narrow band of light frequencies, and it is non-cumulative by incremental self-cancellation for other frequencies. The cumulative diffraction effect occurs when the momentum vectors of the incident light and acoustic waves satisfy the relation that their sum equals the momentum vector of the output light beam. This condition is called "phase matching" A narrow band of frequencies satisfying this relation and diffracted into the orthogonal polarization is then passed by the output analyzer 17 while the light of the initial polarization is blocked. If desired, the output polarizer 17 may be polarized in the Z direction to pass the non-diffracted light and block the diffracted light.

Diffraction into the orthogonal polarization occurs via the $P_{41}$ photoelastic constant, and is only cumulative if:

$$|\vec{k}_o| - |\vec{k}_e| = |\vec{k}_a|$$

where $o$, $e$, and $a$ denote the ordinary and extraordinary light waves, and the acoustic wave, respectively. This will be the case if the light and acoustic frequencies $f_o$ and $f_a$ are related by:

$$f_o = \frac{cf_a}{V|\Delta n|}$$

where $c/V$ is the ratio of the light velocity in vacuum to the acoustic velocity in the medium, and $\Delta n$ is the birefringence of the crystal.

In a typical case of lithium niobate, the acousto-optic device 11 is tunable from 7,000 to 5,500 A by changing the acoustic drive frequency from 750 to 1,050 MHz. A bandpass of less than 2 A is obtained for the output beam.

It has been found that, in certain crystal materials including quartz, lithium niobate and lithium tantalate, when the wave front of the acoustic wave is oriented normal to the Y-axis and the phase velocity vector of the acoustic wave is collinearly oriented in the direction of propagation of the optical beam, the acoustic wave "walks-off" from the optical beam along the direction of the group velocity vector of the acoustic wave. The interaction between the acoustic and optical waves is then less than optimum, and the distance over which the interaction occurs is reduced.

Figure 2:
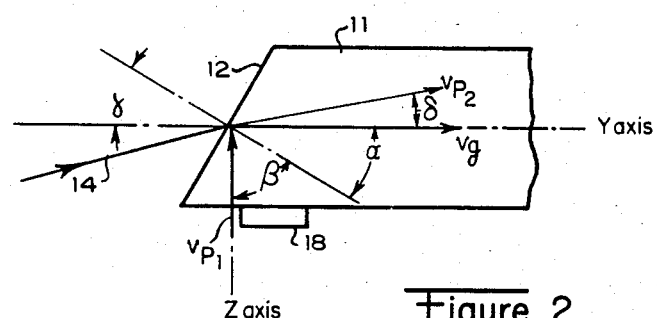
FIG. 2 is a schematic diagram of the input end of the acousto-optic device of FIG. 1 showing the relationship between the input face angle and other parameters utilized to produce a device in which the interaction between the acoustic beam and the optical beam is optimized by proper face orientation.

In the present invention, and referring now to the schematic diagram of FIG. 2, the input end surface 12 of the anisotropic medium 11 is oriented so as to provide an acoustical wave S reflected through the medium 11 with its group velocity vector $\vec{v}_g$ substantially aligned with the Y-axis, whereby optimum interaction between the acoustic and optical waves is produced and with its phase velocity vector $\vec{v}_p$ extending off at an angle relative to the Y-axis.

For the case of a quartz crystal 11, the face angle $\gamma$ for the input end 12 of the crystal 11 is determined as follows:

$$\frac{\sin(\alpha+\delta)}{v_{P_2}} = \frac{\sin \beta}{v_{P_1}}$$

where $\beta$ is the angle of incidence of the acoustic wave on the input surface or face 12, $v_{P_1}$ is the phase velocity of the acoustic wave in the first path $l_1$ in the crystal and is normal to the phase fronts of the wave acoustic from the transducer 18, (i.e. $4.67 \times 10^5$ cm/sec), and $v_{P_2}$ is the phase velocity of the acoustic wave in the second path $l_2$ in the crystal (i.e. $3.46 \times 10^5$ cm/sec).

Since $$\alpha + \beta = \frac{\pi}{2}$$

$$\beta = \frac{\pi}{2} - \alpha$$

and $$\sin(\alpha+\delta) = \frac{v_{P_2}}{v_{P_1}} \sin\left(\frac{\pi}{2} - \alpha\right)$$

Since $$\alpha = \gamma$$

and $$\sin\left(\frac{\pi}{2} - \alpha\right) = \sin\frac{\pi}{2} \cos \alpha = \cos \sigma$$

$$\cos \gamma = \frac{v_{P_1}}{v_{P_2}} \sin(\gamma + \delta)$$

Substituting the values of $v_{P_1}$ and $v_{P_2}$ given above, $$\cos \gamma = \frac{4.67}{3.46} \sin(\gamma + 17.47°)$$

where $\delta$ is the walk-off angle between the group and phase velocity vectors of the acoustic wave and equals 17.47°. From the last equation, it may be determined that $\gamma = 24.78°$. Thus, the face angle of quartz crystal 11, if made substantially 24.78°, will result in the group velocity vector of the acoustic wave lying along the Y-axis of the quartz crystal, thereby rendering optimized interaction with the optical wave.

By following a similar technique, it has been determined that the face angle which will give optimum interaction between the acoustic wave and the optical wave for a lithium niobate (LiNbO$_3$) crystal, for which the walk-off angle is −8.53°, is $\gamma = 51.52°$ and for lithium tantalate (LiTaO$_3$), which has a walk-off angle of 6.67°, is $\gamma = 40.72°$.

Figure 3:
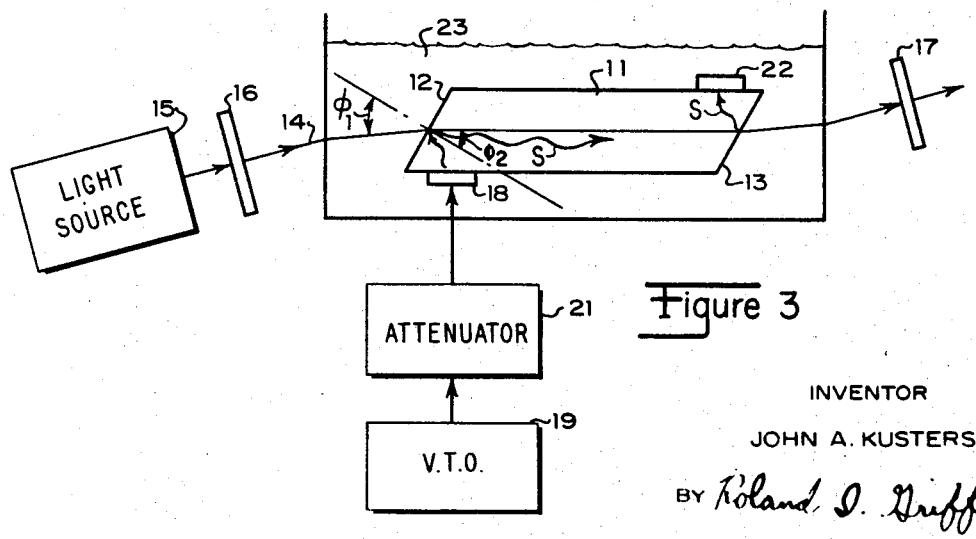
FIG. 3 is a schematic diagram of another improved form of acousto-optic filter wherein the optical beam transmission is enhanced by immersing the main body of the filter in a suitable bath.

In order to optimize the aperture for the incoming optical beam and the percentage of light transmission, the acousto-optical filter may be placed in an index matching fluid bath 23, for example, water, as shown in FIG. 3, such that the light beam is passed through the water before it enters the input end 12 of the quartz body 11.

The angle $\phi_1$, that the light beam passing through the fluid makes with the normal to the input surface 12 is given by the relationship $$n_1 \sin \phi_1 = n_2 \sin \phi_2,$$

where $n_1$ is the index of refraction of the fluid, $n_2$ is the index of refraction of the quartz body 11, and $\phi_2$ is the angle between the optical beam passing from the surface 12 into the quartz body and the normal to the surface 12. Since $n_1$, $n_2$ and $\phi_2$ are known, $\phi_1$ may be determined for any particular medium 11 and any particular bath fluid 23. In the case of quartz in water, it turns out that when the end surface 12 is selected to direct the group velocity vector $\vec{v}_g$ of the acoustic wave along the Y-axis as described above, the optical beam enters the quartz body 11 at approximately Brewster's angle and practically full optical transmission is realized.

Figure 4:
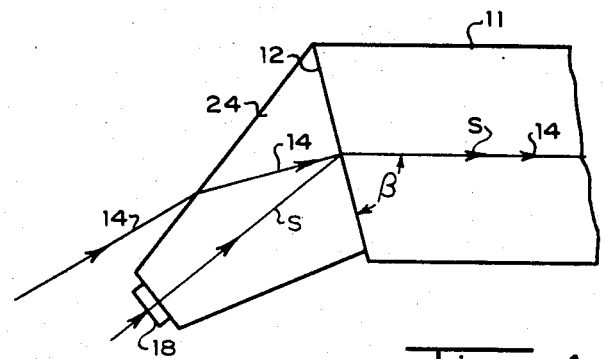
FIG. 4 a schematic diagram of still another form of improved acousto-optic device employing three media through which the optical beam passes, the acoustic wave being passed through two of these media to obtain the desired alignment with the optical beam.

In the above described embodiments, the acoustic wave was directed into the crystal so as to be reflected off the end surface into collinearity with the optical wave along the Y-axis. The acoustic wave may be transmitted through the crystal by using refracting techniques, with the acoustic wave passing through the input end surface. One such device is shown in FIG. 4 where both the optical wave 14 and the acoustic wave from the transducer 18 are passed through fused quartz 24 into the quartz crystal 11.

Figure 4A:
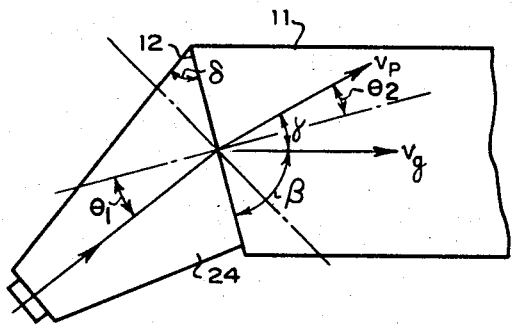
FIGS. 4a and 4b are schematic diagrams of the acousto-optic device of FIG. 4 showing the input angles for the acoustic wave and optical wave, respectively.

In selecting the direction for the acoustic wave through the fused quartz 24 (region 1) and the quartz body 11 (region 2) the relationships set forth below are employed (See FIG. 4a).

We will assume that the boundary between regions 1 and 2 is perfect and that region 1 is isotropic, i.e., no difference in the direction of the group and phase velocity vectors $\vec{v}_g$ and $\vec{v}_p$, while region 2 has an angle of $\gamma$ between the $\vec{v}_g$ and $\vec{v}_p$ vectors, and $$|\vec{v}_p| = \frac{|\vec{v}_g|}{\cos \gamma}$$

Also, $$\frac{1}{v_{p_1}} \sin \theta_1 = \frac{1}{v_{p_2}} \sin \theta_2$$

or, in simplified notation, $$\frac{1}{v1} \sin \theta_1 = \frac{1}{v2} \sin \theta_2$$

Therefore, $$\frac{\sin \theta_1}{\sin \theta_2} = \frac{v1}{v2}$$

The values of $v_1$, $v_2$ and $\gamma$ are known, i.e. $v_1$ (fused quartz) is $3.76 \times 10^5$, $v_2$ (quartz) is $3.46 \times 10^5$, and $\gamma$ for quartz as noted above is 17.5°. We need $\theta_1$, $\theta_2$ and $\beta$. Since $\beta = \pi/2 - \gamma + \theta_2$, $$\theta_2 = \beta + \gamma - \pi/2$$

and $$\sin \theta_1 = \sin\left(\beta + \gamma - \frac{\pi}{2}\right) \frac{v_1}{v_2}$$

$$\theta_1 = \sin^{-1}\left[\frac{v_1 \sin\left(\beta + \gamma - \frac{\pi}{2}\right)}{v_2}\right]$$

Since $$\beta + \gamma \geq \frac{\pi}{2}$$

$$\theta_1 = \sin^{-1}\left[\frac{v_1 \cos(\beta + \gamma)}{v_2}\right]$$

We can arbitrarily select a value for $\beta$ and determine $\theta_1$. For example, if we select an angle of 90° for $\beta$, then $\theta_1$ for the fused quartz is 18.96°.

Figure 4B:
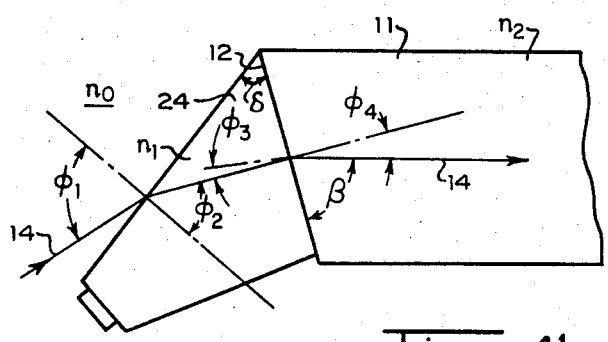

In selecting the direction for the optical wave through the fused quartz 24 and quartz body 11, the following relationships are employed (See FIG. 4b):

$$\eta_0 \sin \phi_1 = \eta_1 \sin \phi_2$$

$$\eta_1 \sin \phi_3 = \eta_2 \sin \phi_4$$

or, since $\eta_0 = 1$ for air and $\phi_4 = \pi/2 - \beta$, $$\sin \phi_1 = \eta_1 \sin \phi_2$$

$$\eta_1 \sin \phi_3 = \eta_2 \sin(\pi/2 - \beta) = \eta_2 \cos \beta.$$

Therefore, $$\phi_3 = \sin^{-1}\left[\frac{\eta_2 \cos \beta}{\eta_1}\right]$$

Since $$\delta = \phi_2 + \phi_3$$

$$\phi_2 = \delta - \sin^{-1}\left[\frac{\eta_2 \cos \beta}{\eta_1}\right]$$

and $$\phi_1 = \sin^{-1}\left[\eta_1 \sin\left\{\delta - \sin^{-1}\left(\frac{\eta_2 \cos \beta}{\eta_1}\right)\right\}\right]$$

$$= \tan^{-1}(\eta_1) \text{ for Brewster's condition}$$

Also, if $\phi_1$ is to approximate a Brewster window, then $\tan \phi_1 = \eta_1$.

Since $$\sin \phi_1 = \eta_1 \sin \phi_2,$$

$$\tan \phi_1 = \eta_1 = \eta_1 \frac{\sin \phi_2}{\cos \phi_1}$$

Therefore $$\cos \phi_1 = \sin \phi_2$$

and $$\phi_2 = \sin^{-1}[\cos \phi_1]$$

Since $$\phi_3 = \sin^{-1}\left[\frac{\eta_2 \sin \beta}{\eta_1}\right]$$

$$\delta = \sin^{-1}[\cos \phi_1] + \sin^{-1}\left[\frac{\eta_2 \cos \beta}{\eta_1}\right]$$

In the case of fused quartz (region 1) and quartz (region 2) in air (region 0), $\eta_0 = 1.00$, $\eta_1 = 1.46$, $\eta_2 = 1.55$, $\beta$ is arbitrarily selected at 90°, $\delta = 34.4°$ and $\phi_1 = 55.6°$.

To improve the aperture of the optical beam passing into the fused quartz, the acousto-optical filter may be placed into an oil bath in lieu of air, where $\eta_0$ for a typical oil such as Cargille No. 42 silicone oil is 1.63. In such case, $\phi_1$ becomes 30.43° and the optical beam is thus directed more normal to the surface of the fused quartz, increasing the aperture.

Thus, by proper selection of materials and surface angles, the directions of the acoustic beam and the optical beam through the filter may be adjusted to give optimum interaction, and the optical beam may be directed so as to obtain maximum transmission.

Other materials may be utilized for the crystal 11 and the input material 24, as well as the bath 23, if desired. For example, when YAG is used for input material 24 with a quartz crystal 11, $v_1 = 5.00 \times 10^5$, $v_2 = 3.46 \times 10^5$, $\eta_1 = 1.84$ for YAG, $\eta_2 = 1.55$, $\gamma = 17.5°$, and with $\beta$ at 90°, $\theta_1 = 25.8°$, $\phi_1 = 61.6°$ and $\delta = 28.4°$.

With a crystal 11 of $LiNbO_3$ and YAG as an input material 24, $\nu_1 = 5.00 \times 10^5$, $\nu_2 = 3.915 \times 10^5$, $\eta_1 = 1.84$, $\eta_2 = 2.29$, $\beta = 105.55°$, $\theta_1 = \delta = 9.0°$, $\phi_1 = 61.48°$ and $\gamma = 8.53°$. It can be seen that this is a poor design relative to that for quartz and fused quartz described above.

I claim:

1. A method for diffracting light from a first polarization to a second polarization, said method comprising the steps of producing an acoustic wave in an acoustically and optically anisotropic birefringent medium, directing light of the first polarization through the anisotropic birefringent medium along a path for which the group and phase velocity vectors of the acoustic wave are noncollinear, and adjusting the direction of the acoustic wave in the anisotropic birefringent medium so that the group velocity vector of the acoustic wave is substantially collinear with the path of the light passing through the anisotropic birefringent medium, at least some of the light of the first polarization directed through the anisotropic birefringent medium being shifted from the first polarization to the second polarization by diffraction on the acoustic wave therein.

2. The method of claim 1 including the step of seperating light of one of said polarizations from light of the other of said polarizations.

3. The method of claim 1 wherein said anisotropic birefringent medium is quartz.

4. The method of claim 1 including the step of passing the light of the first polarization through a second medium before transmission into said anisotropic birefringent medium.

5. The method of claim 4 wherein said second medium is a fluid forming a bath for said anisotropic birefringent medium.

6. The method of claim 4 wherein said anisotropic birefringent medium is a crystalline material and said second medium is a fluid.

7. The method of claim 6 wherein said anisotropic birefringent medium is quartz and said second medium is water.

8. The method of claim 1 including the step of passing both the acoustical wave and the light of the first polarization through a second medium before transmission into said anisotropic birefringent medium, said second medium having an acoustic velocity and index of refraction different from that of said anisotropic birefringent medium.

9. The method of claim 8 wherein said anisotropic birefringent medium is quartz and said second medium is fused quartz.

10. The method of claim 8 including the step of passing the light of the first polarization through a third medium before transmission into said second medium.

11. The method of claim 10 wherein said third medium is a fluid forming a bath for said anisotropic birefringent medium and said second medium.

12. Apparatus for diffracting light from a first polarization to a second polarization, said apparatus comprising an acoustically and optically anisotropic birefringent medium, means for producing an acoustic wave in the anisotropic birefringent medium, means for directing light of the first polarization through the anisotropic birefringent medium along a path for which the group and phase velocity vectors of the acoustic wave are noncollinear, and means for directing the acoustic wave through the anisotropic birefringent medium so that the group velocity vector of the acoustic wave is substantially collinear with the path of the light passing through the anisotropic birefringent medium, at least some of the light of the first polarization directed through the anisotropic birefringent medium being shifted from the first polarization to the second polarization by diffraction on the acoustic wave therein.

13. Apparatus as in claim 12 including means for separating light of one of said polarizations from light of the other of aid polarizations.

14. Apparatus as in claim 12 wherein said anisotropic birefringent medium is quartz.

15. Apparatus as in claim 12 including means for passing the light of the first polarization through a second medium before transmission into said anisotropic birefringent medium.

16. Apparatus as in claim 15 wherein said second medium is a fluid forming a bath for said anisotropic birefringent medium.

17. Apparatus as in claim 15 wherein said anisotropic birefringent medium is a crystalline material and said second medium is a fluid.

18. Apparatus as in claim 17 wherein said anisotropic birefringent medium is quartz and said second medium is water.

19. Apparatus as in claim 12 including means for passing both the acoustic wave and the light of the first polarization through a second medium before transmission into said anisotropic birefringent medium, said second medium having an acoustic velocity and index of refraction different from that of said anisotropic birefringent medium.

20. Apparatus as in claim 19 wherein said anisotropic birefringent medium is quartz and said second medium is fused quartz.

21. Apparatus as in claim 20 including means for passing the light of the first polarization through a third medium before transmission into said fused quartz.

22. Apparatus as in claim 21 wherein said third medium is water.

23. Apparatus as in claim 19 including means for passing the light of the first polarization through a third medium before transmission into said second medium.

24. Apparatus as in claim 23 wherein said third medium is a fluid forming a bath for said anisotropic birefringent medium and said second medium.

* * * * *

UNITED STATES PATENT OFFICE
CERTIFICATE OF CORRECTION

Patent No. 3,687,521   Dated August 29, 1972

Inventor(s) John A. Kusters

It is certified that error appears in the above-identified patent and that said Letters Patent are hereby corrected as shown below:

Column 1, line 52, "medium anisotropic" should read -- anisotropic medium --;

Column 2, line 29, after "FIG. 4" insert -- is --;

Column 3, line 34, between "'phase matching'" and "A" insert -- . --;

Column 4, line 42, "$\sin\left(\frac{\pi}{2} - \alpha\right) = \sin\frac{\pi}{2} \cos\alpha = \cos\sigma$" should read -- $\sin\left(\frac{\pi}{2} - \alpha\right) = \sin\frac{\pi}{2} \cos\alpha = \cos\alpha$ --;

Column 5, line 9, "where$n_1$" should read -- where $n_1$ --;

Column 6, line 68, "$5.00 \times 10^3$" should read -- $5.00 \times 10^5$ --;

Column 7, line 2, "$5.00 \times 10^3$" should read -- $5.00 \times 10^5$ --;

Column 8, line 21, "aid" should read -- said --.

Signed and sealed this 13th day of February 1973.

(SEAL)
Attest:

EDWARD M. FLETCHER, JR.
Attesting Officer

ROBERT GOTTSCHALK
Commissioner of Patents